J. R. HOWARD.
PORTABLE BUILDING.
APPLICATION FILED FEB. 11, 1919.
1,354,753.
Patented Oct. 5, 1920.
6 SHEETS—SHEET 1.
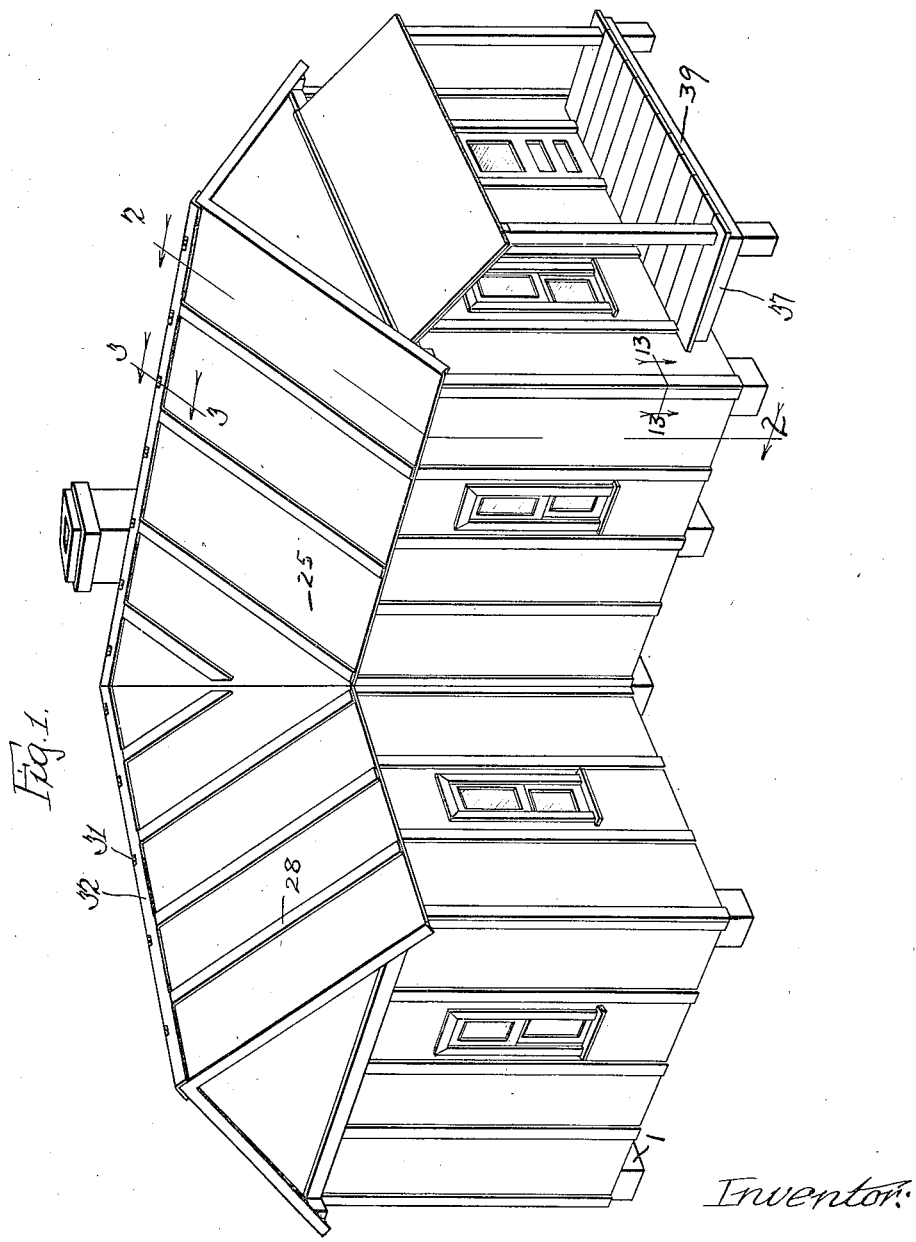

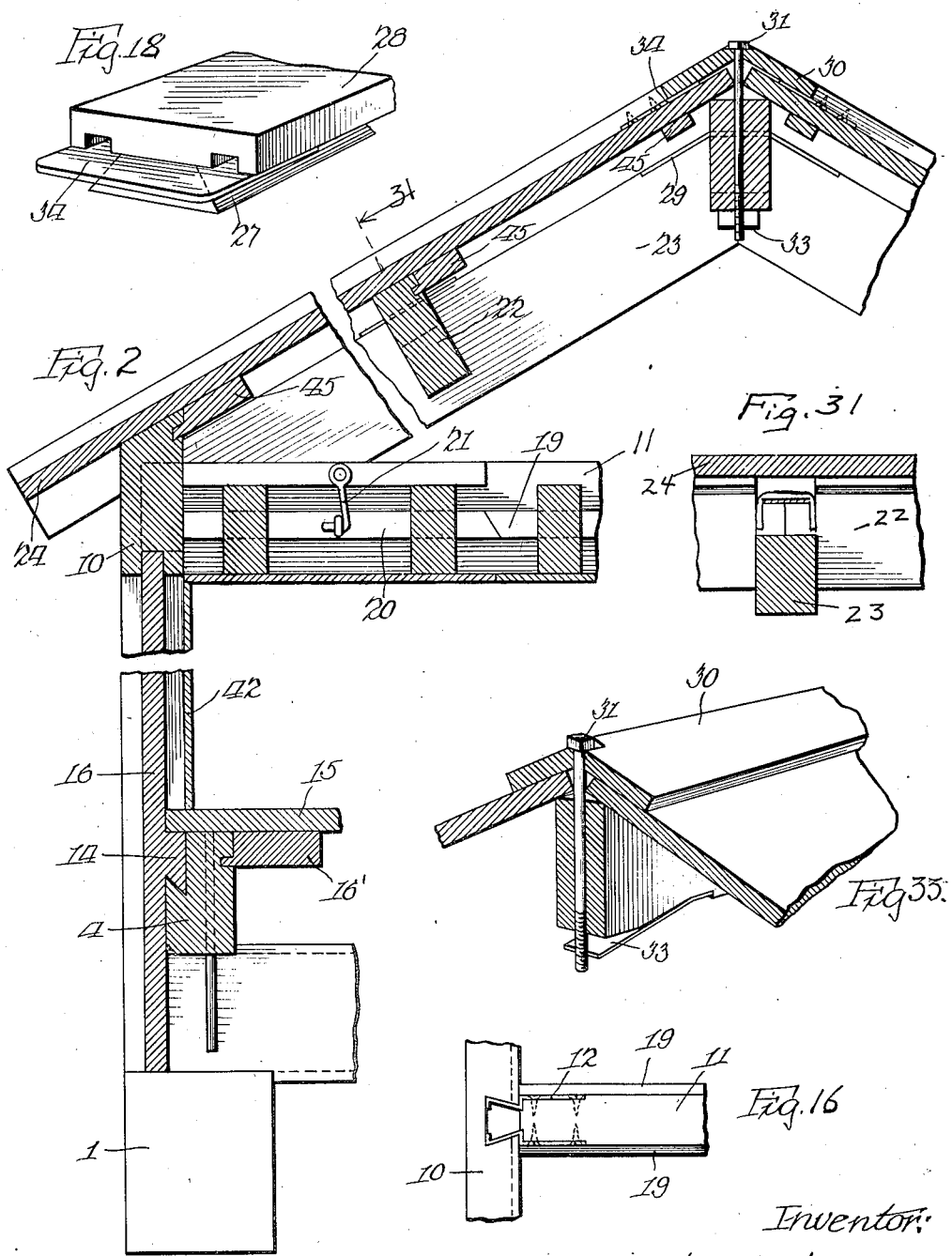

J. R. HOWARD.
PORTABLE BUILDING.
APPLICATION FILED FEB. 11, 1919.
1,354,753.
Patented Oct. 5, 1920.
6 SHEETS—SHEET 3.
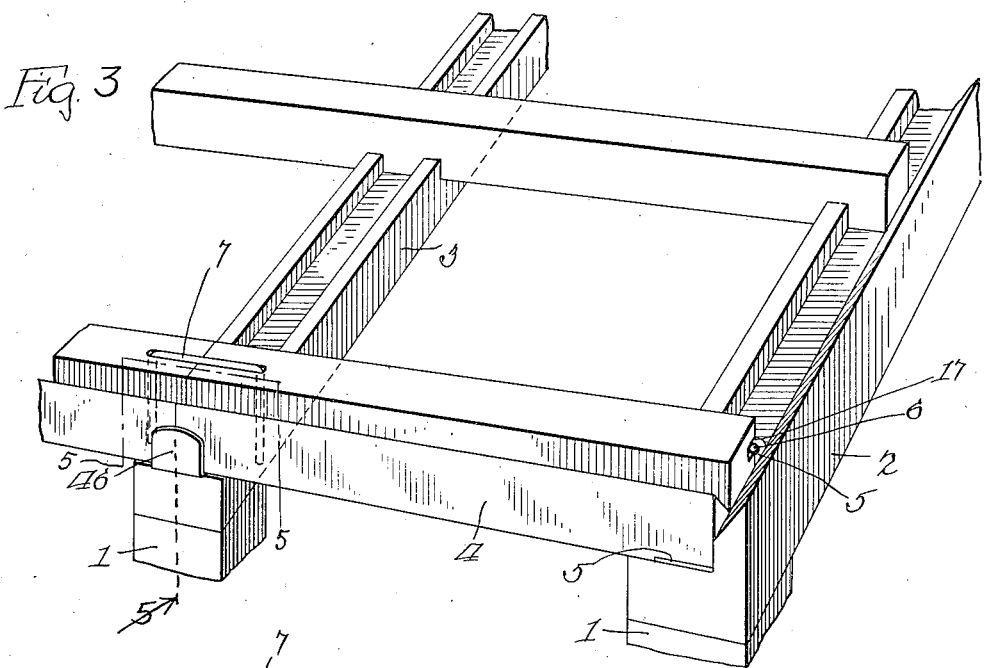
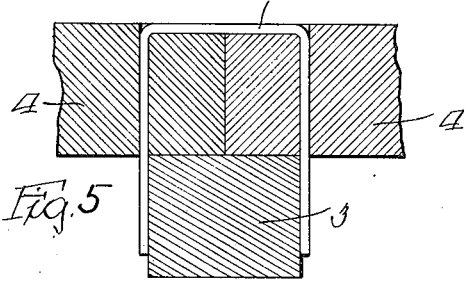
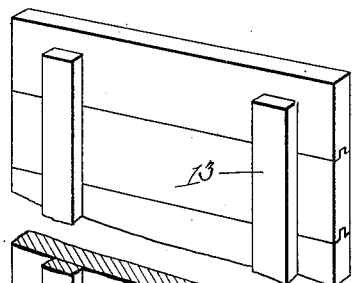
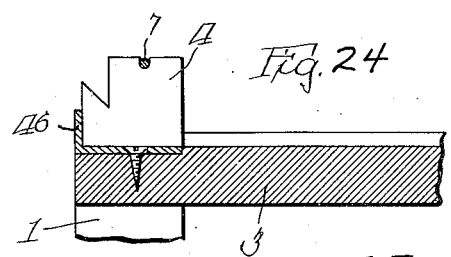
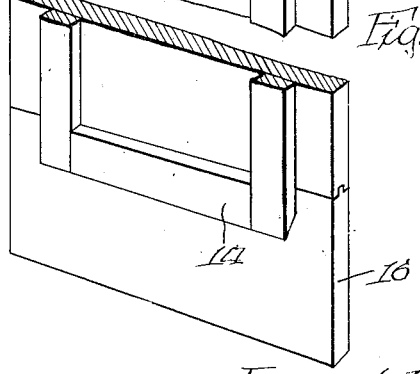
Inventor:
Jesse R. Howard J. R. HOWARD.
PORTABLE BUILDING.
APPLICATION FILED FEB. 11, 1919.
1,354,753.  Patented Oct. 5, 1920.
6 SHEETS—SHEET 4.
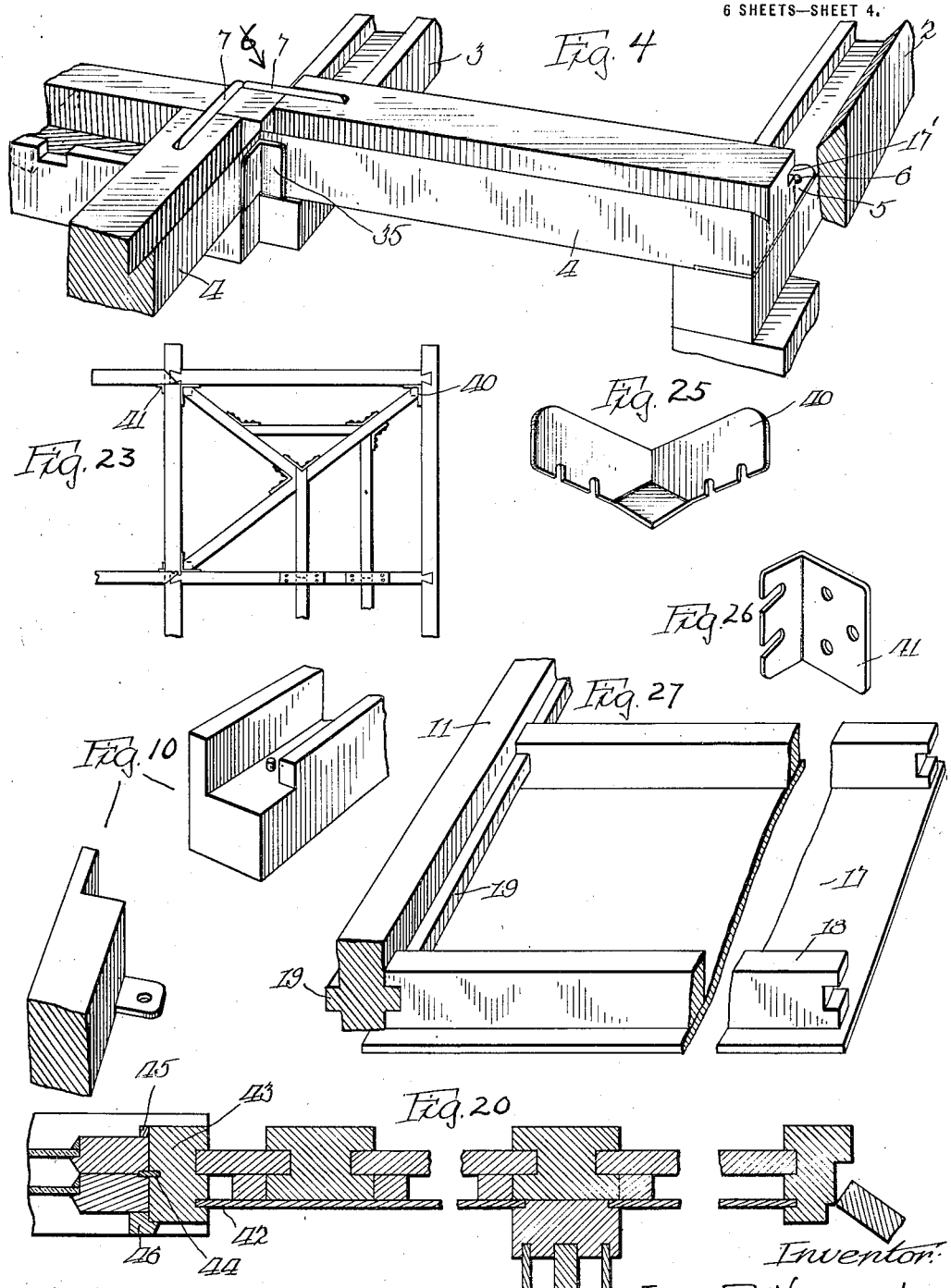

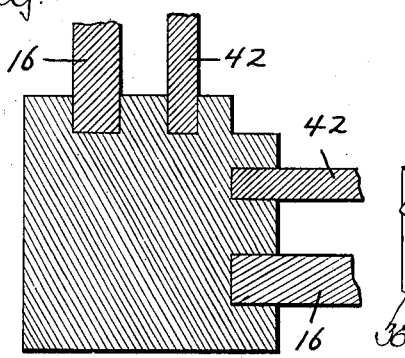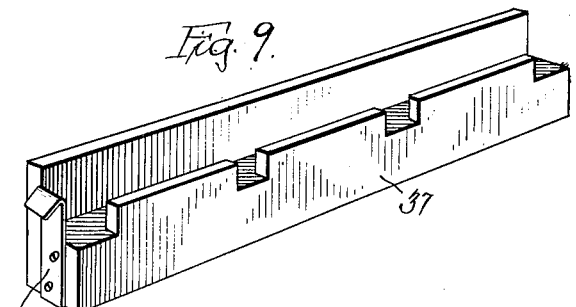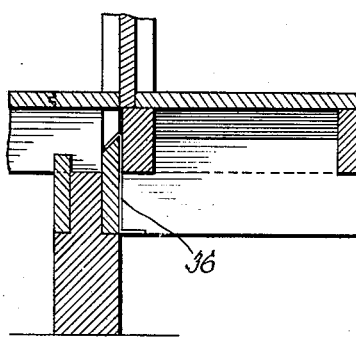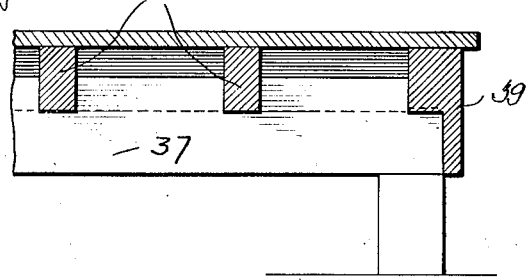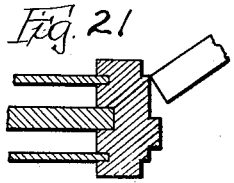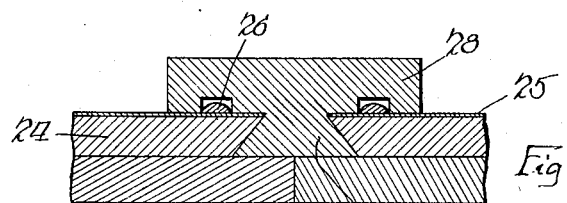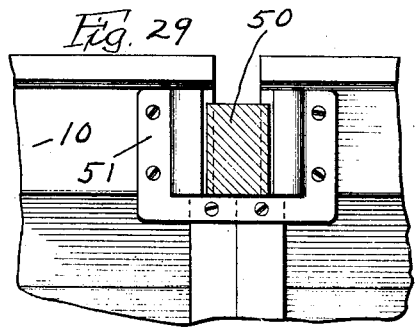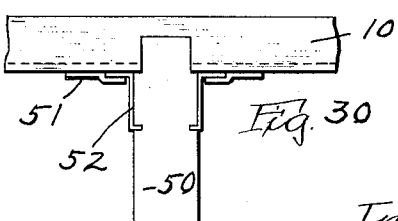

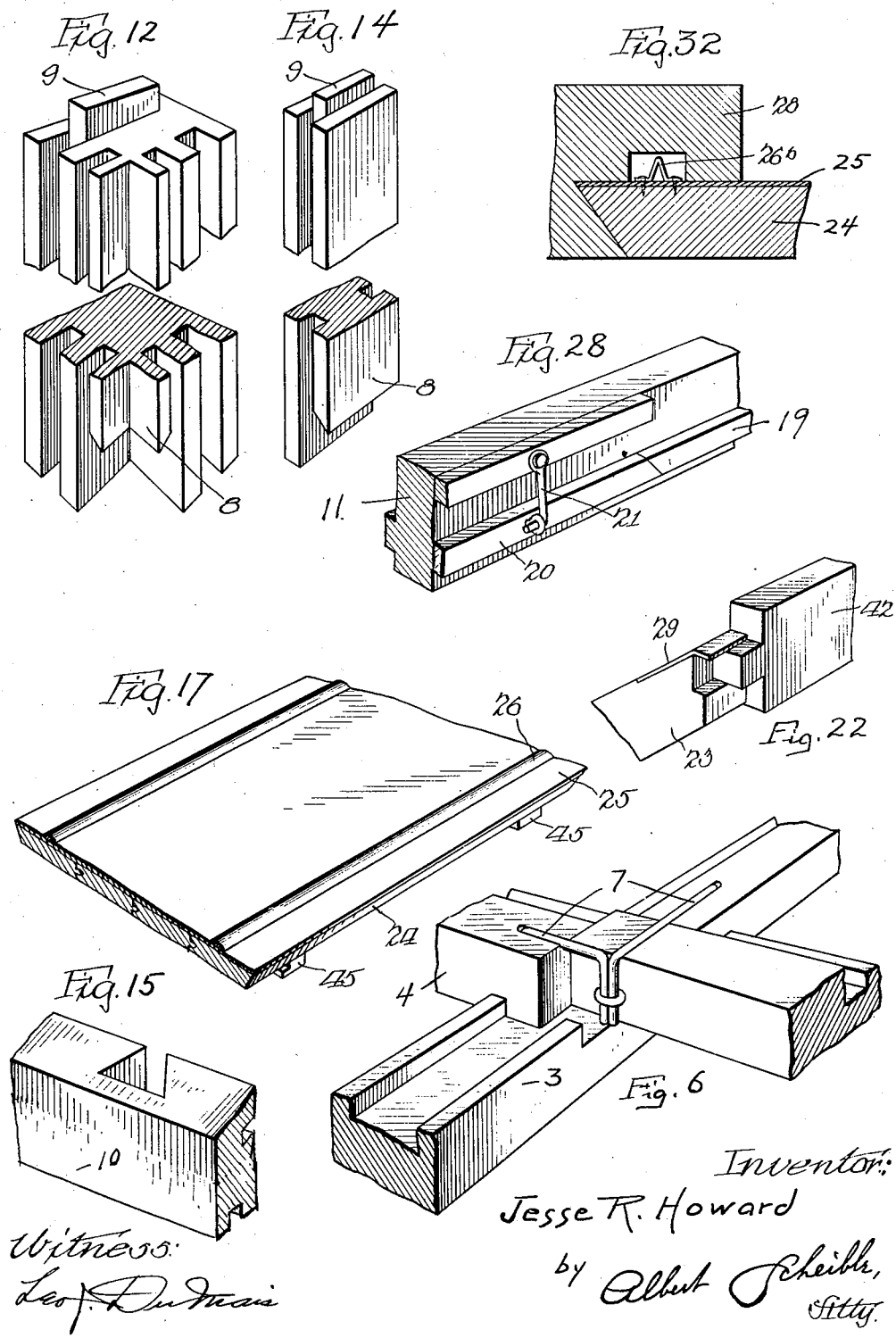

UNITED STATES PATENT OFFICE.

JESSE R. HOWARD, OF CHICAGO, ILLINOIS, ASSIGNOR OF ONE-FOURTH TO E. M. LANNES, OF CHICAGO, ILLINOIS.

PORTABLE BUILDING.

1,354,753.  Specification of Letters Patent.  Patented Oct. 5, 1920.

Application filed February 11, 1919. Serial No. 276,430.

*To all whom it may concern:*

Be it known that I, JESSE R. HOWARD, citizen of the United States, residing at Chicago, in the county of Cook and State of Illinois, have invented certain new and useful Improvements in Portable Buildings; and I do hereby declare the following to be a full, clear, and exact description of the invention, such as will enable others skilled in the art to which it appertains to make and use the same.

My invention relates to buildings of the socalled portable or ready-made type; that is to say, to buildings for which the constituent parts may be shipped in such a form as to obviate the necessity of cutting lumber on the ground, thereby avoiding waste as well as shipping expenses and permitting the desired building to be erected without employing skilled labor.

In one of its general aspects, my invention relates to buildings of this socalled ready-made type, and aims to provide constituent parts so formed that they can readily be shipped with little risk of damage in transit, and so arranged that the constituent parts can readily be interconnected without the attaching of nails, screws or other fastening elements. As a part of this general aspect, my invention aims to provide main members adapted interchangeably for use with duplicates thereof in the construction of buildings of various sizes and shapes, and provides main members so formed that they will interengage both with one another and with the minor members of the building, so that the constituent members of the building will automatically support one another and hold one another in the desired spacing or other relations. For example, my invention aims to provide combined sills and girders equipped for automatically spacing the floor joists without the use of nails and likewise for preventing a movement of such joists in any horizontal direction. Likewise, it aims to provide pilasters and side sections equipped for interlocking with each other and for interlocking with such sills; to provide wall plates equipped for interlocking with the upper ends of both the pilasters and the wall sections; to provide roof trusses equipped for interlocking with the wall plates; to provide roof purlins equipped for interlocking with the roof trusses, roof sections equipped for interlocking with the roof purlins, and roof battens equipped for interlocking with adjacent roof sections, and to provide floor sections arranged for anchoring wall sections to prevent a raising of the latter.

Likewise, my invention aims to provide pilasters equipped for interlocking not only with the outside wall sections of the building, but also for interlocking with corresponding wall board sections for affording an interior finish; to provide ceiling sections equipped for interlocking with the truss beams; to provide waterbanks on the roof sections equipped for coöperating with corresponding formations on the roof battens; to provide porch joists equipped for attaching the same at one end to a sill of the building; to provide corner pilasters equipped for interlocking directly with both of the combined girders and sills extending to the corresponding corner; to provide simple means coöperating with the wall plates and the trusses for holding the upper ends of the corner pilasters in proper position; to provide window and door formations adapted for interlocking with the other elements of my building construction; and to provide simple means for interlocking constituent elements with each other in the construction of buildings of widely varying sizes and shapes. Furthermore, my invention aims to provide pilasters, door frames and window frames all so arranged as to afford both exterior and interior trim for the adjacent wall sections. Still further objects will appear from the following specification and from the accompanying drawings in which Figure 1 is a perspective view of a frame building embodying my invention.

Fig. 2 is an enlarged and fragmentary vertical transverse section through the same building along the line 2—2 of Fig. 1.

Fig. 3 is a perspective view showing the arrangement of the girders, sills and joists at one corner of the building.

Fig. 4 is a similar view showing the method of joining sill portions in constructing an L for a building.

Fig. 5 is an enlarged vertical section taken along the correspondingly numbered line of Fig. 3 showing the method of preventing the relative longitudinal movement of adjacent sections of the sill.

Fig. 6 is a perspective view taken from the correspondingly numbered arrow of

Fig. 4 and showing the method of locking adjacent girder portions against relative horizontal movement.

Fig. 7 is a perspective view of the metal hook member 35 of Fig. 4.

Fig. 8 is a fragmentary vertical section showing the method of supporting the porch joists, girders and headers.

Fig. 9 is a perspective view of the combined porch joist, girder and header of Fig. 8.

Fig. 10 is a perspective view showing the end of a porch joist and the adjacent end of a porch face, together with the means employed for interlocking the same.

Fig. 11 is a fragmentary perspective view of one of the side sections of the building.

Fig. 12 is a fragmentary perspective view of one of the corner pilasters.

Fig. 13 is a horizontal section through one of the corner pilasters and through portions of the side sections of double walls interlocked therewith.

Fig. 14 is a fragmentary perspective view of one of the intermediary pilasters in a single wall building.

Fig. 15 is a fragmentary perspective view of a portion of the wall plate of Fig. 2.

Fig. 16 is a plan view of a portion of the wall plate and of a part of the truss beam interlocked therewith.

Fig. 17 is a fragmentary perspective view of one of the roof sections.

Fig. 18 is a perspective view of the upper end of one of the roof battens.

Fig. 19 is a longitudinal section through a portion of the roof, showing the arrangement of the roof batten, roofing and waterbanks.

Fig. 20 is a horizontal section through a portion of the side of the building and a partition within the same, showing the arrangement of the windows, partitions and doors.

Fig. 21 is a fragmentary horizontal section showing the construction of a door frame in an inner partition.

Fig. 22 is a detail view showing the juncture of a ridge pole section with a truss.

Fig. 23 is a horizontal view showing the arrangement of the hip rafters and trusses in connection with the roof for an L-shaped building.

Fig. 24 is a vertical section through the forward end of the left hand girder of Fig. 5, showing the manner of interlocking the sill with the same.

Fig. 25 is a perspective view of the hip or valley seat used for supporting the hip and valley rafter in Fig. 23.

Fig. 26 is a perspective view of the steel angle plate used for connecting an extension wall plate portion to a main wall plate portion in constructing an L-shaped building, after the manner of Fig. 23.

Fig. 27 is a perspective view showing the method of supporting a ceiling section from the truss beams.

Fig. 28 is a perspective view of a portion of a truss beam, showing the method of supporting the detachable portion of the hanger ledge on the same.

Fig. 29 is a side view of a portion of a wall plate, taken from the inner side and showing a method of securing a beam to the same for a two-story construction.

Fig. 30 is a plan view of the same parts, drawn on a smaller scale.

Fig. 31 is a cross-section taken along the correspondingly numbered line of Fig. 2 and showing the method of connecting roof purlin sections with each other by a staple, and of supporting these on an inclined truss member.

Fig. 32 is a view similar to Fig. 19 of a modified form of the latter.

Fig. 33, is a fragmentary perspective view, partly in section of the roof ridge structure.

Illustrative of my invention, Fig. 1 is a perspective view of one of the innumerable types and sizes of buildings which may be constructed from elements as pictured herewith. These elements are desirably made in standard or unit sizes, corresponding to given dimensions of the proposed buildings, so that the building may readily be varied in its horizontal dimensions by merely varying the number of units employed, and may be varied in height by correspondingly varying the height of the vertically disposed elements. For example, I desirably employ sills, floor joists and other horizontal elements made in effective lengths of 6 feet and multiples thereof, although these unit dimensions may be varied as desired. For the pictured embodiments, I start with posts 1 resting upon any suitable foundations and supporting both front and rear sills 2 and intermediate girders 3, after the manner of Fig. 3. Each of these girders is substantially U-shaped in vertical section, and the intermediate girders have both webs of the U cut away at suitable points to afford transverse recesses for receiving the floor joists. Likewise, each of the front and rear girders, which also form the front and rear sills of the building, has its inner web similarly cut away both for the intermediate floor joists and for each of the side sills of the building. Each side sill 4 has fastened to its lower face a strap 5 having a perforation adapted to slip over the pin 6 which extends upwardly from the adjacent front sill as shown in Fig. 3. Likewise, each sill section 4 is prevented from lateral movement at its other end by abutting against the forward webs of the girder 3 in one direction, and by engaging an angle plate 46, as shown in Figs. 3 and 24. Joints between such sill sections are made at the center of the girders, and the adjoining ends are connected by staples 7 which are dropped into vertical bores in the adjacent end portions of the sill, the upper ends of the bores being connected by a suitable groove to permit the back of the staple 7 to be flush with the tops of the sills 4, as shown in Figs. 3 and 5. With the sill sections thus locked to each other and laterally abutting to prevent a shifting of the angles between the same, the sills form a rigidly locked frame, having portions likewise locked to the intervening girders 3 by the lateral engagement of the shanks of the staples 7 with these girders after the manner of Fig. 5. Consequently, these parts lock one another in position, thus forming a grid for supporting the floor joists in the alined notched portions of the girders and sills. These floor joists can likewise be made in sections meeting over the centers of the girders, but desirably staggered in the location of the joints in consecutive joists, as will be readily understood without detailed drawings. In each case, since the end sections of the joists abut against the outer webs of the front and rear girders, the intermediate sections only need to abut at their ends against adjacent joist sections, so that no auxiliary fastening members are needed for the same.

Both the front and rear girders and the side sills also form supports for outer wall sections, and for the pilasters which help to maintain the wall sections in proper position and which also support the roof and ceiling structure. With this object in mind, I bevel the outer web of each of these girders and sills (namely the elements 2 and 4 of Fig. 3) downwardly from the outer face thereof, thereby providing an inclined seat adapted to engage a correspondingly inclined or undercut portion 8 on each of the pilasters, which pilasters serve also as partitions between the wall sections. The intermediate pilasters, as shown in Fig. 14 may simply be H-shaped in horizontal section, thereby affording oppositely directed grooves each adapted to receive an edge of one of the wall sections of Fig. 11. These wall sections are therefore made in widths corresponding to the spacing on these grooves in consecutive pilasters. Each pilaster also has at its upper end a tenon 9 adapted to engage a corresponding mortise in the wall plate 10 surmounting both the pilasters and the wall sections.

At the corners, each pilaster has a pair of the undercut portions 8 extending respectively in directions at right angles to each other after the manner of Fig. 12, and therefore adapted respectively to engage the outer webs on two relatively transverse sills, such as the portions adjacent to the lower right hand corner of Fig. 3. Consequently, the relatively transverse direction of these two inclined portions of the girders will prevent the lower end of each corner pilaster from moving laterally in any direction, while the wall plate extending lengthwise of the building and interlocked with the tenons 9 on the corner pilasters at opposite ends of the building will likewise prevent the upper ends of the corner pilasters from moving lengthwise of the building. So also, a movement of the upper pilaster ends transversely of the building is prevented by the interlocking of the ends of the roof trusses with the wall plate, as hereafter described.

For this latter purpose, I construct suitable roof trusses, each of which is desirably shipped completely assembled and each of which has the truss beam forming its lower or horizontal member equipped at each end with a tenon adapted to engage a corresponding dove tail recess in the wall plate 10. This tenon may be formed directly on the wooden truss beam 11, or may consist of two suitably shaped steel straps 12 after the manner of Fig. 16, from which figure the corresponding shape of the plain wooden end will be obvious. The wall plate 10 itself is grooved at its bottom so as to receive the upper end portion of each wall section, as shown in Figs. 2 and 15. Consequently, the trusses and the wall plates coöperate with the corner pilasters and with the said engagement of the pilaster with the webs on the sills, in constituting a rigid frame work for firmly holding the slidably inserted wall sections. Each of these wall sections may be built up of a number of boards after the manner of Fig. 11, connected to each other by cleats 13, and each such wall section carries a lock cleat 14 adapted to engage the outer web on a sill after the manner of Fig. 2. Likewise, the lateral floor sections 15 each carry cleats 16' adapted to enter grooves 17' (Figs. 2 and 4) for locking the floor to the sills. The extreme edge of the floor section adjacent to each side of the building desirably is notched to admit the cleats 13 on the wall sections and projects over the lock cleats 14 (as in Fig. 2), so that the interlocking of the floor cleats 16' with the adjacent sills also prevents the wall sections from being raised out of their normal positions.

Ceilings are likewise built in sections each comprising a ceiling portion 17 secured to a plurality of ceiling beams 18. Each of these beams is notched at both ends so as to fit over hanger ledges 19 on the truss beams 11, after the manner of Fig. 27. To permit of sliding these ceiling sections into position, I desirably make the end section of the hanger ledge detachable and provide suitable means, such as a hook 21, for detachably supporting the end section of the hanger ledge in its normal position. After the trusses of the building are in place and before the detachable hanger ledge section is placed in position, I raise one ceiling section after another up to the truss beams opposite the space left by the omission of the detachable ledge portion and slide each such ceiling section laterally into its normal position. Then I finally raise the end section of the ceiling into position with the detachable ledge portion 20 interlocked with the same and latch this ledge portion in its normal or supporting position by means of the hook 21 of Figs. 2 and 28.

For the roof construction, I provide roof purlins 22 adapted to engage notched portions in the inclined truss member 23, (after the manner of Fig. 2) and also provide ridge pole sections resting in notches at the adjacent ends of the inclined truss members 23 as shown in Figs. 2 and 22. Then I provide roof sections each desirably consisting of a flat board portion 24 covered with roofing 25 secured to it by waterbanks 26. The roof boards 24 desirably extend downwardly of the roof and are secured to each other by roof cleats 45, some of which cleats have downwardly projecting ledges adapted to interlock with grooves in the intermediate roof purlins 22 and in the wall plates 10, as shown in Fig. 2. Consequently, these interlocking ledge portions of the roof cleats 45 will coöperate with gravity in keeping the roof in position. To cover the gaps between adjacent roof sections, I employ roof battens 28, each of which battens desirably has a dovetail inner portion 27 adapted to fit against the correspondingly inclined edges of the adjacent roof boards 24; and each batten also has on its inward face a pair of longitudinal grooves adapted to house the waterbanks 26, after the manner of Fig. 19. Each of the waterbanks may consist simply of a substantially half round wooden molding, or may consist of a suitably shaped metal strip 26<sup>B</sup> as shown in Fig. 20. In either case, since these waterbanks are placed near the lateral edges of the roof sections, the roofing proper may be secured to the roof boards 24 merely by the fastening of these waterbanks, and the nails or tacks used for this purpose will be housed by the roof battens, thereby shielding them from the weather and preventing the unsightly appearance of rust stains on the roofing. Consequently, I not only improve the appearance of the finished roof but also avoid the labor and expense heretofore necessary for fastening the roofing in place, though I may nail the roofing to the boards at their ends.

For the ridge construction, I desirably employ ridge poles carried by the inclined truss members after the manner of Fig. 22, each ridge pole section being slipped at each end between the correspondingly notched portion of a truss member 23 and a metal strap 29, which strap locks the ridge pole against a possible lifting due to strains on the roof in case of violent storms. Then I surmount the upper ends of the roof sections with a ridge member of substantially inverted V-shaped section, fastened to the ridge poles by bolts 31. Each of these bolts desirably extends through a perforation in the ridge member 30 and through a correspondingly located perforation in the adjacent ridge pole, and desirably engages at its lower end with a latching tongue 33, which tongue serves as a substitute for a nut and permits the fastening to be effected from the top of the roof after all of the roof sections as well as the ridge members are in place. To insure a water tight joint between the ridge members 30 and the roof battens 28, I not only bevel the upper end of the dovetail portion 27 as shown in Fig. 18 but also equip this upper end with a metal plate 34 which slips under the ridge member 30 as shown in Fig. 2 and hence affords the desired tight joint.

In practice, it will be obvious that the floor cleats 16 and the roof cleats 45 anchor the wall and roof portions respectively against raising, while the weight of the trusses and the roof will prevent both of these from being lifted out of position. Moreover, gravity coöperates with the above described locking formations in interlocking the various members against lateral movement to afford a rigid construction in which only the finishing element, namely the ridge member 30, needs to be secured by means of fastening elements which are here shown in the form of bolts. Consequently, with the constituent parts made at the factory according to the proper dimensions, it will be obvious that neither a saw nor a hammer, nor nails or screws will be required in assembling the entire structure, the only tool needed being a wrench or the like for manipulating the bolts 31. It will likewise be obvious that by unscrewing these same bolts and starting at the top of the building, the structure can readily be taken apart, either entirely, or to such an extent as will readily permit of the addition of other units if it is desired to increase the size of the building. I am therefore providing not only a building of the ready-made type which can be erected practically without the use of tools but also one which can readily be altered in size and which can be knocked down and again erected somewhere else. So also, it will be obvious that I accomplish the interlocking of associated parts almost entirely without using projecting metal elements which are apt to be damaged in transit thereby reducing the risk of injury in the handling of the parts. Furthermore, while the above described methods of interlocking sectional elements may be suitable for use in connection with the simplest form of buildings intended for various purposes, they likewise readily adapt themselves to more elaborate and complicated structures. For example, doors and windows in any desired size and arrangement may readily be constructed at the factory as parts of certain of the wall sections, so that these are readily mounted in position by simply erecting the wall sections in any desired order. Likewise, the same fundamental principle of interlocking the sills 4 with one another can be employed for providing extensions of the building in various directions, as for example the L-shaped extension at the left hand end of the building of Fig. 1. For this purpose, I simply equip the girder 3 of Fig. 4 with a suitably formed strap hook 35, as shown in detail in Fig. 7. Then instead of using staples 7 to interlock girders which aline with each other, I secure the free shanks of two such staples to each other by means of a screw eye as shown in Fig. 6.

Where a porch is to be provided, I use the outer or sloping web on the front sill 2 as the support for hangers 36 fastened to the rear ends of the porch girders 37 and of corresponding porch joists, each of these hangers being in the form of a hook as shown in Figs. 8 and 9, and each of the girders being notched intermediate its ends for receiving the floor joists 38 and notched at its outer end for receiving a single piece member 39 which forms a combined joist and watertable.

Where an L-shaped building or other shape of building requires a hip roof, I equip parts of the wall plate with suitably disposed pins or screws for supporting seats, as for example for supporting the hip or valley seat 40 of Figs. 23 and 25, or the extension truss seat 41 of the Figs. 23 and 26.

Moreover, the same general construction can be carried out equally well for buildings finished on their interior, in which case I desirably groove the pilasters not only for receiving the outer wall boards 16 but also for receiving inner sections 42 of wall board, after the manner of Figs. 2, 13 and 21. The same double grooving may also be extended to the window frames, which frames desirably comprise at each side a single main portion 43 and three stops associated with the same, namely a parting stop 44, an outer blind stop 45 and an intermediate window stop 46, thus affording the exceedingly simple construction shown in Fig. 20. For partitions, the corresponding pilasters may likewise be rabbeted as shown in the middle portion of Fig. 20 to receive the edges of an inside wall or partition section, and to receive a pair of wall boards spaced from the latter, while each outer door frame requires at each side only a single vertical member rabbeted as shown at the right hand end of Fig. 20. For inner or partition doors, a similarly simple construction is ample, as shown in Fig. 21. Thus, the pilasters, door frames and window casings all serve automatically as finished exterior and interior trim for the wall boards, without requiring added trimming of any kind.

However, while I have pictured and described many of the constituent elements of my buildings as composed of single pieces, such as the ones shown in Figs. 12, 14 and 28, I do not wish to be limited to making all parts of such members integral with each other, it being obvious that they might be assembled at the factory out of a number of separate pieces with the same resulting effect. Neither do I wish to be limited to other details of the construction and arrangement here disclosed, since the same might obviously be modified in many ways without departing from the spirit of the appended claims.

For example, the method of interlocking abutting timbers by means of staples after the general manner of Figs. 3, 5 and 6 may be employed with equal effectiveness in other parts of the building, as in joining the roof purlin sections 22 of Fig. 31. Likewise, beams 50 may be substituted for the entire trusses when a second story is to be added, these beams being interlocked with the wall plates and resting at their ends on tops of pilasters after the manner of the heretofore described horizontal members of the roof trusses. Likewise, equivalents may be substituted for some of the pictured formations, as for example, socket plates 51 secured to the wall plates 10 and interlocking with hooks 52 on the horizontal timbers (as in Figs. 29 and 30) may be substituted for a dovetail connection between the wall plates and the horizontal members interlocked therewith.

I claim as my invention:

1. In a building, sills having outwardly projecting seats which incline downwardly and inwardly and located below the tops of the sills, pilasters having side grooves and having their rear faces abutting the seats and having inclined parts conformably and interlockingly engaged in said seats, wall members engaged at their sides in the spaces at the sides of the pilasters and abutting the sills, horizontal members on the wall members conformably and interlockingly engaged in said seats, and floor members seated on the sills and on the top faces of the horizontal members to hold the latter against upward movement.

2. In a building, sills having outwardly projecting seats which incline downwardly and inwardly and located below the tops of the sills, wall members abutting the sills, horizontal members on the wall members conformably and interlockingly engaged in said seats, and floor members seated on the sills and on the top faces of the horizontal members of the wall members to hold the latter against upward movement.

3. In a building, sills having outwardly projecting seats which incline downwardly and inwardly and located below the tops of the sills, wall members abutting the sills, horizontal members on the wall members conformably and interlockingly engaged in said seats, floor members seated on the sills and on the top faces of the horizontal members of the wall members to hold the latter against upward movement, and cleats on the floor members having tongue and groove connections with the sills to hold the floor members against upward movement.

4. In a building, sills, wall members abutting the outer faces of the sills, interlocking means between the wall members and sills, floor members seated on the sills and engaged with the interlocking means of the wall members to hold the latter against upward movement, and interlocking means between the sills and the floor members to hold the latter against upward movement.

5. In a building, floor girders, floor sills seated on the girders and having seats, wall members having parts engaged in the seats, inverted U-members received through the sills and engaging on opposite sides of the girders to hold the sills against movement transversely of the girders and floor members overlying the tops of the U-members to hold the latter against vertical movement.

6. In a building, sills, wall members abutting the outer faces of the sills and having interlocked connection therewith, floor members seated on the sills and overlying said interlocked connection to hold the wall members against upward movement and means to lock said floor members to the sills against upward movement.

7. In a building, sills having seats on their outer faces which incline downwardly and inwardly, wall members abutting the sills and having horizontal cleats which are inclined to conformably engage in the seats, and floor members seated on the sills and on the top faces of the cleats to hold the wall members against upward movement.

8. In a building, sills having seats on their outer faces which incline downwardly and inwardly, wall members abutting the sills and having horizontal cleats which are inclined to conformably engage in the seats, and members overlying the cleats to hold the wall members against upward movement.

9. In a building, sills secured to each other to prevent relative lateral movement thereof; wall members arranged in laterally adjacent groups, each group slidably engaging one of the sills; wall plates respectively slidably topping the groups of wall members, and means rigidly and directly connecting opposite wall plates and having their end faces abutting the latter and thereby maintaining the wall members associated with these wall plates in their normal positions.

10. In a building, sills, wall members supported at their lower ends by the sills, wall plates interlocked with the upper ends of the wall members, beams interposed between and connecting opposite wall plates, and interlocking connections between the ends of the beams and the inside vertical faces of the wall plates.

11. In a building, sills, wall members supported at their lower ends by the sills, wall plates interlocked with the upper ends of the wall members, beams connecting opposite wall plates, and having vertical parts abutting the inner faces of the wall plates, and mortise and tenon connections between the ends of the beams and the wall plates.

12. In a building of the class described, a sill, a substantially U-shaped girder having both shanks thereof cut away at one end thereof for a length corresponding to the width of the sill and thereby affording a ledge upon which the sill rests transversely of the girder; and a metal element secured to the girder substantially at its end and presenting a finger extending upwardly with its inner face substantially flush with and forming a part of the end of the girder and engaging the outer face of the sill.

13. In a building, a sill, a U-shaped girder having both shanks cut away at one end to form a ledge to receive the sill, and a metal L-shaped element having its base secured to the ledge and receiving the sill thereon and having its vertical portion forming a part of the end of the sill and engaging with the outer face of the sill.

14. In a building, a sill, a girder having an end thereof cut away to form a ledge upon which latter the sill seats, and a metal element having a part underlying the sill and having a part extending vertically and forming a part of the end of the girder and engaged with the outer face of the sill.

Signed at Chicago, Illinois, February 6th, 1919.

JESSE R. HOWARD.